Patented Feb. 10, 1942

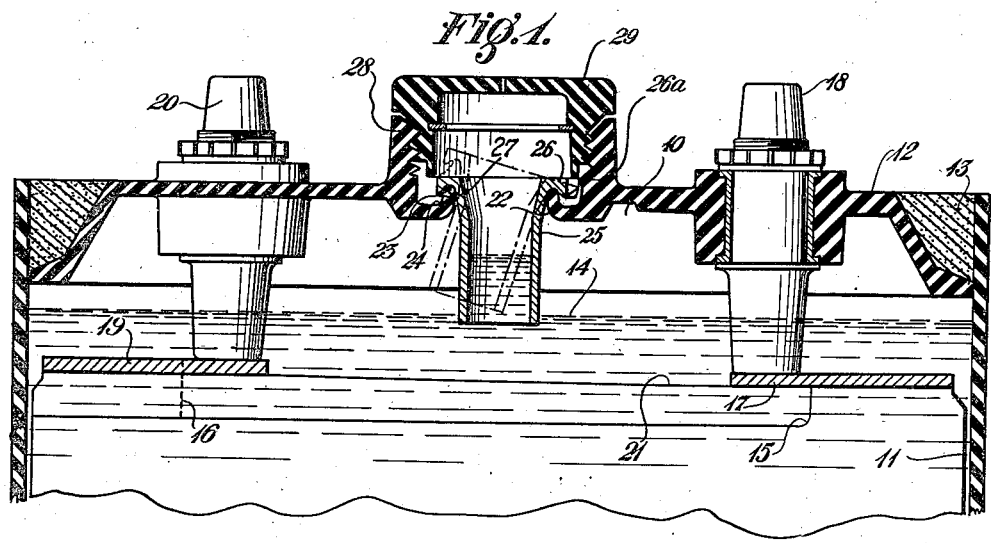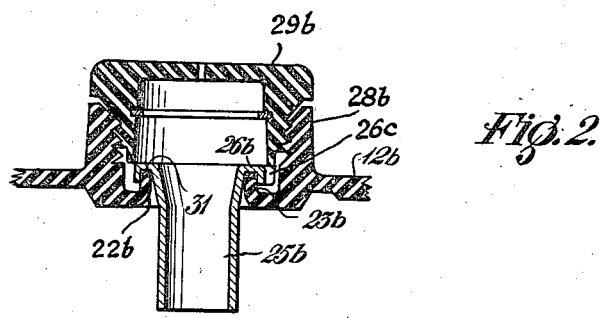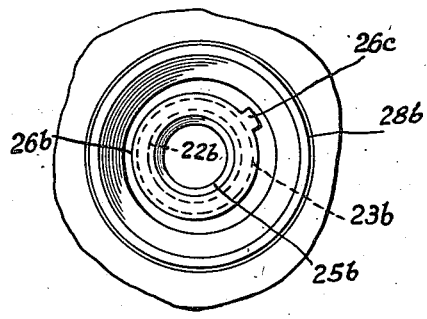

2,272,898

UNITED STATES PATENT OFFICE 2,272,898

FILLING AND VENTING DEVICE

Lawrence E. Olcott, Akron, Ohio, assignor to The Firestone Tire & Rubber Company, Akron, Ohio, a corporation of Ohio Application February 3, 1940, Serial No. 317,184

7 Claims. (Cl. 136—178)

This invention relates to filling and venting devices, more especially to the filling and venting devices provided in storage battery cells.

Heretofore a wide variety of types of filling and venting devices have been provided, and many attempted to solve the problem of preventing the over-filling of the chambers with which they are associated. However, some of these venting devices are impractical in the sense that they have a short life, other devices must have a cap manually positioned over an auxiliary opening associated therewith before they function properly, others require the use of sealing devices which are easily bent or otherwise disfigured, so that they do not function satisfactorily, and still other filling and venting devices are commercially unsatisfactory for either the above or other reasons.

The general object of the present invention is to provide a filling and venting device which functions automatically to prevent over-filling of its associated chamber and which is a commercially satisfactory construction.

Another object of the invention is to provide a device that is sturdily but inexpensively constructed and which has a long operative life without requiring any servicing thereof.

The above and further objects will be made apparent by the following specification.

Attention is directed to the accompanying drawing, in which:

Figure 1 is a vertical sectional elevation of a storage battery cell having one embodiment of the improved filling and venting device of the invention associated therewith;

Figure 2 is a vertical sectional elevation of a modified form of filling and venting device; and Figure 3 is a plan of the filling and venting device of Figure 2 with the cap removed.

Broadly speaking, the present invention comprises providing some type of hollow or tubular means which are received in the vent opening of a storage battery cell and extend downwardly into the cell to the desired, or normal, upper surface of the electrolyte contained therein, and designing the tubular means so that the outer surface thereof is seated on the vent opening by an air-tight seat, the formation of which is aided by a film of water usually present in the construction of the invention. This forms an air-tight chamber in the upper part of the battery cell between the upper surface of the electrolyte and the inner surface of the top of the cell, excluding the portion thereof within the tubular means, when the tubular means contacts the upper surface of the electrolyte, whereby the cell cannot be over-filled with electrolyte. Further means are provided to break the air-tight seal formed between the hollow means and the vent opening so that any electrolyte contained in the tubular means can run from it down into the main electrolyte body.

While the present invention is described with reference to storage battery cells, it will be appreciated that the filling and venting devices of the invention can be used with any closed member having a vent opening, which member is to be prevented from being completely filled with liquid.

Referring specifically to Figure 1 of the drawing, a storage battery cell 10 having side walls 11 and upper, or cover plate 12, which is suitably secured to the side walls 11 by an adhesive composition 13, is provided. A suitable electrolyte 14 is received in the cell 10 while the usual sets of storage battery plates 15 and 16 also are positioned in the cell 10. The plates 15 are secured to a bar 17 that in turn is secured to a terminal post 18, while the plates 16 are secured to a similar bar 19 that is associated with a terminal post 20. These terminals 18 and 20 extend through the cover 12 to provide means for withdrawing current from the battery cell 10 in a well-known manner. Separators 21 are positioned between the plates 15 and 16.

A vent opening 22 is formed in the cover 12 to permit insertion or withdrawal of electrolyte relative to the cell 10. Note that the vent opening 22 is outlined by an upwardly extending flange 23 that has a recess 24 formed around its periphery. In one sense, the flange 23 may be said to be merely the normal surface of the cover 12, which surface has the recess 24 formed therearound, although generally this portion of the cover 12 is called flange 23. Then to prevent complete filling of the cell 10 with electrolyte 14, a hollow member or sleeve 25, preferably tubular and made from lead, is received in the vent opening 22 and normally extends downwardly therefrom to the upper surface of the electrolyte 14, as shown. Note that the hollow member, or sleeve 25 gradually increases in diameter at its upper end and that an outwardly extending flange 26 is formed on the upper surface thereof, which flange may have a recess 27 formed on its under surface to aid in engaging it with the flange 23. One portion 26a of the flange 26 extends outwardly relative to the remainder thereof, for a purpose hereinafter to be described. One important feature of the invention is that the sleeve 25 is seated on the flange 23 by an air-tight seat so that an airtight space, or chamber is formed in the upper portion of the cell 10 between the upper surface of the electrolyte 14 and the lower surface of the cover 12, excluding the portion thereof in the bore of sleeve 25, when the electrolyte contacts the lower end of the sleeve 25. Hence when electrolyte is first introduced into the cell 10 it runs down through the sleeve 25 into the cell 10 and continued insertion of the electrolyte into the cell 10 fills the cell with same to the level indicated in Figure 1 whereby further addition of electrolyte only fills the sleeve 25, as shown, and then overflows onto the cover 12 due to the air-tight space formed between the lower edge of the sleeve 25 and the lower surface of cover 12.

Since it is desirable to cover the vent opening 22 when the battery cell 10 is in service, an outwardly extending, inwardly tubular threaded boss 28 is integrally formed on the cover 12. This boss 28 outlines the recess 24 and flange 23 formed in the upper surface of the cover 12 and is adapted to have a standard threaded cover member, or cap 29 engaged therewith. Figure 1 clearly shows that the vent opening 22, the flange 23 and recess 24 are all concentric to the boss 28 and that the internal diameter of the cap 29, is slightly larger than the normal external diameter of the flange 26. However, the lug 26a formed on the flange 26 is constructed and arranged so that the lower edge of the cap 29 will engage therewith when the cap is screwed into tight engagement with the boss 28. Upon engagement of the lug 26a with the cap 29, the sleeve 25 is tilted from its normal substantially vertical position whereby one portion of the lower edge of the sleeve usually is raised above the surface of the electrolyte 14 to permit any electrolyte therein to flow down into the pool of electrolyte in the cell 10. Sleeve 25 is tilted due to the fulcruming effect or action produced on it by the association of the cap 29, lug 26a, and portion of the flange 23 adjacent same. Of course, the desired action of removing electrolyte from the sleeve is effected by gravity as soon as the air-tight seat of the sleeve in the vent opening 22 is broken. Breaking this seal also is desirable since it permits escape of gases, formed in the cell 10, through the hole formed in the cap 29.

It appears that the air-tight seating of the sleeve 25 in the vent opening 22 is aided by the presence of a small amount of moisture which seems to be present normally in the recess 24 or on the flange 23. This moisture probably is a portion of electrolyte 14 which has been spilled in filling the cell 10 or else drawn upwardly along the sleeve by capillary action, or else merely vaporized electrolyte that condensed when it reached the cover member 12. Of course, the sleeve 25 must be made of some material which is not acted upon chemically by the electrolyte 14 and the use of a lead sleeve is recommended for most instances, since the weight thereof is sufficient to aid the automatic sealing action effected by the present construction. Hard rubber also is a good material from which the sleeve can be constructed.

Figure 2 shows a modified form of the invention wherein a suitable gasket 31, which may be made from rubber or other acid resistant material, is placed between a flange 26b, formed on a sleeve 25b, and the flange portion 23b of cover 12b. This gasket 31 aids in forming the desired air-tight seat for the sleeve 25b on the flange 26b. In this instance, the vent opening 22b is eccentrically positioned with relation to the boss 28b formed on the cover 12b and the sleeve 25b must be positioned with the lug 26c on the flange 26b at the portion of the vent opening 22b spaced the greatest distance from the boss 28b to prevent the lug 26c from contacting or wedging against the boss.

The modified construction of the invention shown in Figures 2 and 3 is desirable because it enables the construction of a maximum size vent opening 22b within the boss 28b, or it may be considered as allowing the boss 28b to have a minimum external diameter. Figure 3 clearly shows that the lug 26c on the sleeve 25b must be positioned so that the lug is associated with the portion of the flange 23b which is at substantially maximum distance from the inner surface of the boss 28b. Note that only a minimum clearance is provided between one section of the flange 23b and the inner surface of the boss 28b, but that the cap 29b still is adapted to tilt the sleeve 25b over the flange 23b and break its airtight seat thereon. Then the position of the sleeve 25b is limited with relation to the vent opening 22b, but at the same time the boss 28b may have a minimum diameter for a maximum size vent opening. Note that the embodiment of the invention shown in Figure 1 provides unnecessary clearance for one side of the sleeve 25, but that the positioning of the sleeve 25 in the vent opening 22 in that case is not restricted in any manner.

From the foregoing description, it will be seen that the present invention provides an automatically functioning venting and filling device which prevents the over-filling of the member with which it is associated and that this construction can be readily and easily manufactured at low expense.

While a written description and illustration of two embodiments of the invention are disclosed herein, it will be understood that various modifications can be made without departing from the scope of the invention as defined in the appended claims.

What is claimed is:

1. In a filling and venting device, an inclosed chamber partially defined by a wall having an opening therein, said wall having an upwardly extending flange outlining said opening, an integral threaded annular boss formed on said wall outlining and spaced from said flange; a sleeve having an outwardly extending flange formed on its upper end and extending through said opening with its outwardly extending flange engaged with said upwardly extending flange, said sleeve extending downwardly from said opening and normally being vertically positioned, and a threaded vented cover for said opening engaging with said boss and adapted to bear upon said outwardly extending flange to tilt said sleeve from its normal vertical position.

2. In a storage battery cell containing electrolyte and having a venting and filling opening formed in its upper surface, an upwardly extending flange immediately adjacent to and outlining said opening, said cell having a liquid collecting recess formed therein around the periphery of said upwardly extending flange, upwardly extending threaded means having an apertured center portion associated with said cell and outlining said opening, a sleeve having a flange formed at its upper end received in said opening with said flange engaging with said upwardly extending flange and extending downwardly into said liquid collecting recess to form a seal for the upper end of said sleeve, said sleeve normally being vertically positioned and extending downwardly into the cell to the desired upper surface for electrolyte in the cell, said flange on said sleeve having an outwardly extending protuberance formed thereon, and vented cover means for said opening adapted to engage with said threaded means and to bear upon said protuberance to tilt said sleeve from its seat on said upwardly extending flange.

3. In a chamber containing liquid and having a venting and filling opening formed in the cover thereof, tubular means having a flange at its upper end received in said opening and extending directly downwardly therefrom to the desired upper surface of the liquid, a portion of said cover around and defining said opening having a recess formed therein, said flange engaging with the portion of said cover defining said opening by an air-tight seat, an upwardly directed boss outlining said recess associated with the upper surface of said cover, and a vented cap adapted to engage with said boss to cover said opening and with a portion of said flange to tilt said tubular means over the portion of said cover defining said recess and break its airtight seat on said cover.

4. In a liquid containing chamber having a venting and filling opening formed in the cover thereof, tubular means having an outwardly extending flange at its upper end received in said opening and extending downwardly into the chamber to define the liquid level desired therein, a portion of said cover around and defining said opening having a liquid collecting recess formed therein immediately adjacent said opening, said tubular means being seated on said opening by an airtight seal formed by said flange engaging with said recess whereby liquid poured into the chamber can only fill it to the level of the lower edge of said tubular means and then fill said tubular means and overflow the container, an upwardly extending apertured threaded boss formed on said cover and outlining said recess, and a vented cap for said opening adapted to engage with said boss, said vented cap being adapted to engage with said flange and tilt said tubular means upon the portion of said cover defining said recess as a fulcrum whereby the airtight seat of said tubular means is broken and liquid contained in said tubular means runs down into the chamber.

5. In a liquid containing chamber having a venting and filling opening formed in the cover thereof, tubular means having an outwardly extending flange at its upper end received in said opening and extending downwardly into the chamber to define the liquid level desired therein, a portion of said cover around and defining said opening having a liquid collecting recess formed therein immediately adjacent said opening, the flange on said tubular means being provided with a projection on its under surface adapted to extend into said recess, said tubular means being seated on said opening by an airtight seal formed by said flange engaging with said recess, an upwardly extending apertured threaded boss formed on said cover and outlining said recess, and a vented cap for said opening adapted to engage with said boss, said vented cap being adapted to engage with said flange and tilt said tubular means upon the portion of said cover defining said recess as a fulcrum whereby the airtight seat of said tubular means is broken.

6. In a device as claimed in claim 1, a gasket positioned upon said upwardly extending flange, said sleeve being positioned on the upper surface of said gasket which aids in forming an airtight seat therefor.

7. In a storage battery cell containing electrolyte and having a venting and filling opening formed in its upper surface, an upwardly extending flange outlining said opening, upwardly extending threaded means having an apertured center portion associated with said cell and outlining said opening in eccentric relationship thereto, a sleeve having a flange formed at its upper end received in said vent opening with said flange engaging with said upwardly extending flange and forming a water-tight seal therewith, said sleeve normally being vertically positioned and extending downwardly into the cell to the desired upper surface of the electrolyte, said flange on said sleeve having an outwardly extending protuberance formed thereon which contacts said upwardly extending flange in some positions of said sleeve on said opening and limits the position of said sleeve with relation to said upwardly extending flange, and vented cover means for said opening adapted to engage with said threaded means and to bear upon said protuberance to tilt said sleeve from its seat on said upwardly extending flange, said eccentric relationship of said opening and said threaded means adapting said upwardly extending threaded means to have a minimum internal diameter.

LAWRENCE E. OLCOTT.